(12) United States Patent
Cang et al.

(10) Patent No.: US 7,383,567 B2
(45) Date of Patent: Jun. 3, 2008

(54) METHOD AND SYSTEM FOR CREATING A SUBSET OF PROGRAMMING CHANNELS

(75) Inventors: Yongmei Cang, Indianapolis, IN (US); Shu Lin, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1420 days.

(21) Appl. No.: 09/916,903

(22) Filed: Jul. 27, 2001

(65) Prior Publication Data

US 2003/0023984 A1  Jan. 30, 2003

(51) Int. Cl.
*H04N 7/173* (2006.01)

(52) U.S. Cl. .............. 725/131; 725/139; 725/151; 348/732

(58) Field of Classification Search .......... 725/56, 725/131, 139, 151; 348/732
See application file for complete search history.

(56) References Cited

U.S. PATENT DOCUMENTS

| | | | | |
|---|---|---|---|---|
| 4,870,492 | A * | 9/1989 | Hakamada et al. | 348/732 |
| 6,137,546 | A * | 10/2000 | Shintani et al. | 348/731 |
| 6,233,389 | B1 * | 5/2001 | Barton et al. | 386/46 |
| 6,621,528 | B1 * | 9/2003 | Kessler et al. | 348/734 |
| 2005/0028194 | A1 * | 2/2005 | Elenbaas et al. | 725/132 |

FOREIGN PATENT DOCUMENTS

| | | |
|---|---|---|
| EP | 0865202 A1 | 9/1998 |
| GB | 2345598 A | 7/2000 |
| JP | 9-55642 | 2/1997 |
| JP | 11-234092 | 8/1999 |
| JP | 2001-86017 | 3/2001 |
| WO | 01 06771 | 1/2001 |

OTHER PUBLICATIONS

PCT—International Search Report.
Patent Abstracts of Japan vol. 1997, No. 03, Mar. 31, 1997 & JP 08 298441A (Nippondenso Co. Ltd.), Nov. 12, 1996 abstract.
Patent Abstracts of Japan vol. 018, No. 060 (E-1499), Jan. 31, 1994 & JP 05 276457A (Sanyo Electric Co. Ltd., Oct. 22, 1993.

* cited by examiner

*Primary Examiner*—Christopher Grant
*Assistant Examiner*—Chris Parry
(74) *Attorney, Agent, or Firm*—Joseph J. Laks; Robert B. Levy; Jorge T. Villabon

(57) ABSTRACT

The invention concerns a method (200) and system (100) for creating a subset of channels with programming from a plurality of channels and can include the steps of: receiving (210) a plurality of channels, wherein the plurality of channels comprises at least one channel with programming; encoding (212) at least a portion of a predetermined number of channels from the plurality of channels to provide a corresponding encoded signal for each of the predetermined number of channels; processing (214) each of the corresponding encoded signals to determine which of the predetermined number of channels contain programming to provide the subset of channels with programming; and storing (216) the subset of channels into memory. The invention can also include the step of analyzing at least a portion of an audio signal in the predetermined channels to determine which of the predetermined channels contain programming.

17 Claims, 2 Drawing Sheets

METHOD AND SYSTEM FOR CREATING A SUBSET OF PROGRAMMING CHANNELS

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

The inventive arrangements relate generally to video systems and more particularly to video systems that receive video signals containing numerous channels for viewer display.

2. Description of Related Art

Many televisions that receive analog video signals can program into memory those channels that actually contain a broadcast signal. Such an arrangement can permit the television to skip automatically those channels that do not contain broadcast signals thereby eliminating the delay associated with channel surfing through these channels. This skipping of channels is possible because the channels carrying no signals in traditional analog format merely contain random noise or "snow." As such, the television can quickly distinguish between those channels actually carrying a signal from those that do not.

Notably, however, many consumers currently receive video signals from digital broadcast systems (DBS) such as digital satellite or cable television systems. In such systems, the programming provider typically supplies to the consumer a receiving box, which can receive a digital satellite or cable transmission. Once received, the receiving box typically converts the digital signal into an analog signal and then transfers the signal to the television or, in some instances, a storage medium device such as a DVD recorder. The digital signal is converted into an analog signal for purposes of copyright protection among other reasons.

In contrast to conventional analog signals, each channel in a DBS signal typically contains a video signal, even if one or more of the channels carries no programming. For example, DBS signals such as satellite or cable transmissions offer a wide variety of programming transmitted over tens or even hundreds of channels. Each consumer need not, however, subscribe to every available programming channel. Significantly, however, for each channel to which the consumer does not subscribe, the receiving box normally outputs a video signal that contains a still video pattern that may include a message relating to the unavailability of that particular channel. The signal may also include instructions for subscribing to a particular channel and may also include date and time displays.

As each channel output from a DBS system—even those with no programming—contains a video signal, the television or storage medium device is unable to distinguish between the channels that contain programming from those that do not. As a result, the consumer must scroll through these "blank" channels to find the desired programming, as these channels cannot be skipped automatically. The delay created from flipping through these blank channels can be significant because the consumer may not be a subscriber of a substantial number of the channels offered by the programming provider. Thus, what is needed is an automatic channel scanning system and method to eliminate the delay associated with browsing through channels with no programming.

SUMMARY OF THE INVENTION

The present invention concerns a method of creating a subset of channels with programming from a plurality of channels. The method includes the steps of: receiving a plurality of channels, wherein the plurality of channels comprises at least one channel with programming; encoding at least a portion of a predetermined number of channels from the plurality of channels to provide a corresponding encoded signal for each of the predetermined number of channels; processing each of the corresponding encoded signals to determine which of the predetermined number of channels contain programming to provide the subset of channels; and storing the subset of channels into memory. In addition, the method can also include the step of outputting channels exclusively corresponding to the subset of channels. In one arrangement, the method can also include the step of analyzing at least a portion of an audio signal in the predetermined channels to determine which of the predetermined number of channels contain programming.

In one aspect, each encoded signal can be an MPEG video signal containing pictures selected from the group comprising intra pictures or non-intra pictures. In another aspect, the processing step can further include one or more of the steps selected from the group including: counting a number of bits in at least one of the non-intra pictures in the MPEG video signal; analyzing motion vectors in at least one of the non-intra pictures in the MPEG video signal; analyzing discrete cosine coefficients of at least one of the intra pictures in the MPEG video signal; or obtaining a sample picture from one or more of the plurality of channels containing no programming, storing information from the sample picture in memory, and comparing information from at least one of the intra pictures in the MPEG video signal with the stored information from the sample picture.

In another arrangement, the encoding step can further include the step of encoding at least a portion of each of the plurality of channels to provide the corresponding encoded signal for each of the plurality of channels. In addition, the present invention also concerns a method of creating a subset of channels with programming from a plurality of channels including the steps of: receiving a plurality of channels, wherein the plurality of channels comprises at least one channel with programming; processing at least a portion of an audio signal in a predetermined number of channels from the plurality of channels to determine which of the predetermined number of channels contain programming to provide a program channel subset; and storing the program channel subset into memory. Further, the programming on the subset of channels preferably contains video content, and the subset of channels can comprise a plurality of channel indicators for identifying the channels in the subset of channels.

The present invention also concerns a system for creating a subset of channel indicators for channels with programming from a plurality of channels including: a receiver for receiving a plurality of channels, wherein the plurality of channels comprises at least one channel with programming; a video processor programmed to encode at least a portion of a predetermined number of channels from the plurality of channels to provide a corresponding encoded signal for each predetermined channel and process each encoded signal to determine which of the predetermined number of channels contain programming to provide the subset of channel indicators and memory for storing the subset of channel indicators. The present invention also concerns a system for creating a subset of channel indicators for channels with programming from a plurality of channels including: a receiver for receiving a plurality of channels, wherein the plurality of channels comprises at least one channel with programming including audio and/or video; an audio detection circuit for processing at least a portion of an audio signal in a predetermined number of channels from the plurality of channels to determine which of the predetermined number of channels contain programming to provide a program channel indicator subset containing at least video and/or audio; and memory for storing the program channel indicator subset. The system also includes suitable software and circuitry to implement the methods as described above.

DETAILED DESCRIPTION OF THE PREFERRED EMBODIMENTS

Figure 1:
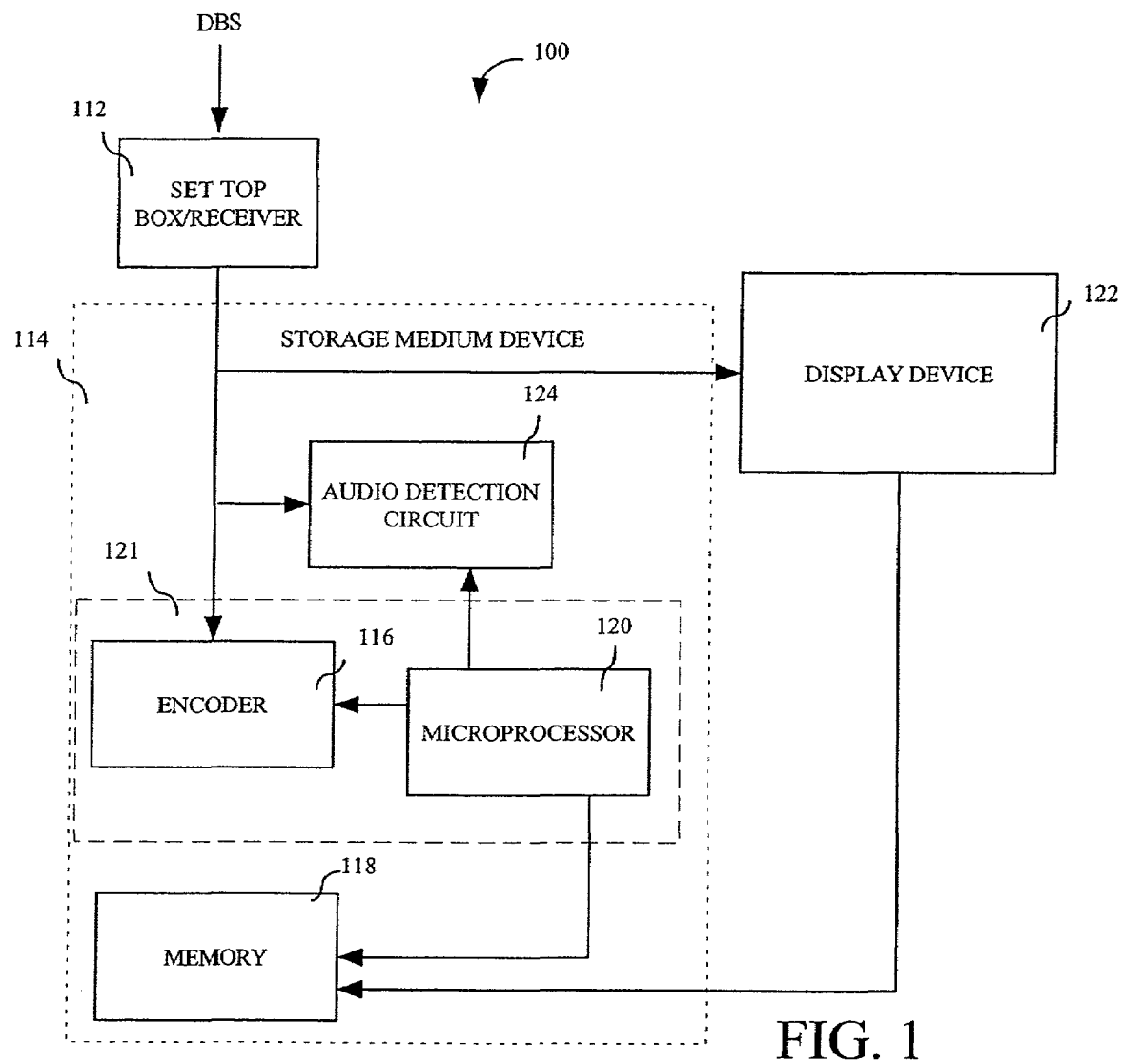
FIG. 1 is a block diagram of a system that can create a subset of programming channel indicators in accordance with the inventive arrangements herein.

A system 100 for implementing the various advanced operating features in accordance with the inventive arrangements is shown in block diagram form in FIG. 1. The invention, however, is not limited to the particular system illustrated in FIG. 1, as the invention can be practiced with any other appropriate system capable of encoding a video signal. The system 100 can include a receiver or set top box 112, a storage medium device 114 and a display device 122. The storage medium device 114 can include an encoder 116, memory 118, a microprocessor 120 and an audio detection circuit 124. The encoder 116 and the microprocessor 120 can be collectively referred to as a video processor 121. In addition, control and data interfaces can also be provided for permitting the microprocessor 120 to control the operation of the encoder 116, memory 118 and the audio detection circuit 124. In an alternative arrangement, the display device 122 can contain the encoder 116, memory 118, the microprocessor 120 and the audio detection circuit 124 thereby eliminating the use of the storage medium device 114.

As shown in FIG. 1, the set top box 112 can receive a digital DBS signal, such as a satellite or cable transmission, containing one or more broadcast channels. Generally, the set top box 112 converts the digital DBS signal into an analog signal and then transfers the analog signal to the storage medium device 114 (if the system 100 contains the storage medium device 114). The storage medium device 114 can then send the signal to the display device 122. The display device 122 can be any suitable device for displaying multimedia data contained in the DBS signal such as an analog or digital television.

As noted earlier, many of these channels, even though they have a broadcast signal, may not contain any programming. For purposes of clarity, the display obtained from these non-programming channels will be referred to as still video patterns. To eliminate the delay associated with browsing through the non-programming channels, the storage medium device 114 can process one or more of these channels to determine which of the incoming channels contains programming. In one arrangement, the encoder 116 can encode a portion of one or more of the incoming channels. Thus, an encoded signal can be created for one or more of these channels. The microprocessor 120 can then process a portion of one or more of these encoded signals to determine which channels contain actual programming and which channels contain still video patterns. Once the microprocessor 120 determines that a particular channel contains programming, that channel number or channel indicator can be stored in memory 118, which can then be accessed by the display device 122. In addition, the audio detection circuit 124 can determine whether any audio exists on a particular channel. Detecting audio can improve the accuracy of the system 100, as the channels that do not contain programming typically do not carry an audio signal. In an alternative arrangement, the audio detection circuit 124 can be used by itself to determine whether a channel contains programming.

Since the channels with programming can be stored in memory 118, the display device 122 is permitted to limit its display to only these channels, and channels with no programming can be automatically skipped. This process of receiving, encoding, processing and storing into memory one or more DBS channels will be explained in greater detail below.

Suitable software or firmware can be provided in memory for the conventional operations performed by the microprocessor 120. Further, program routines for creating a subset of programming channels in accordance with the inventive arrangements can be provided in memory for the microprocessor 120 as well. In one arrangement, the microprocessor 120 and other relevant elements of the system 100 can be programmed to perform automatically the steps necessary for receiving, encoding, processing and storing into memory one or more DBS channels. In addition, those skilled in the art can appreciate that the control CPU 120 can be one or more hardware components or a software program suitable for determining which DBS channels contain actual programming.

CREATING A SUBSET OF PROGRAMMING CHANNELS

According to the inventive arrangements, a subset of channels with programming from a plurality of channels can be created thereby permitting a video system to skip automatically those channels that do not contain programming. It should be understood that the "subset of channels" can mean a subset of channel numbers or channel indicators representing the subset of channels containing programming. Specifically, a plurality of channels can be received in which one or more of these channels contain actual programming. A portion of a predetermined number of these channels can be encoded into intra and/or non-intra pictures, and these intra and non-intra pictures can then be processed to determine which of these predetermined number of channels contain programming for purposes of providing a program channel subset. This program channel subset can then be stored into memory thereby permitting a display device to display only the channels that contain programming.

Figure 2:
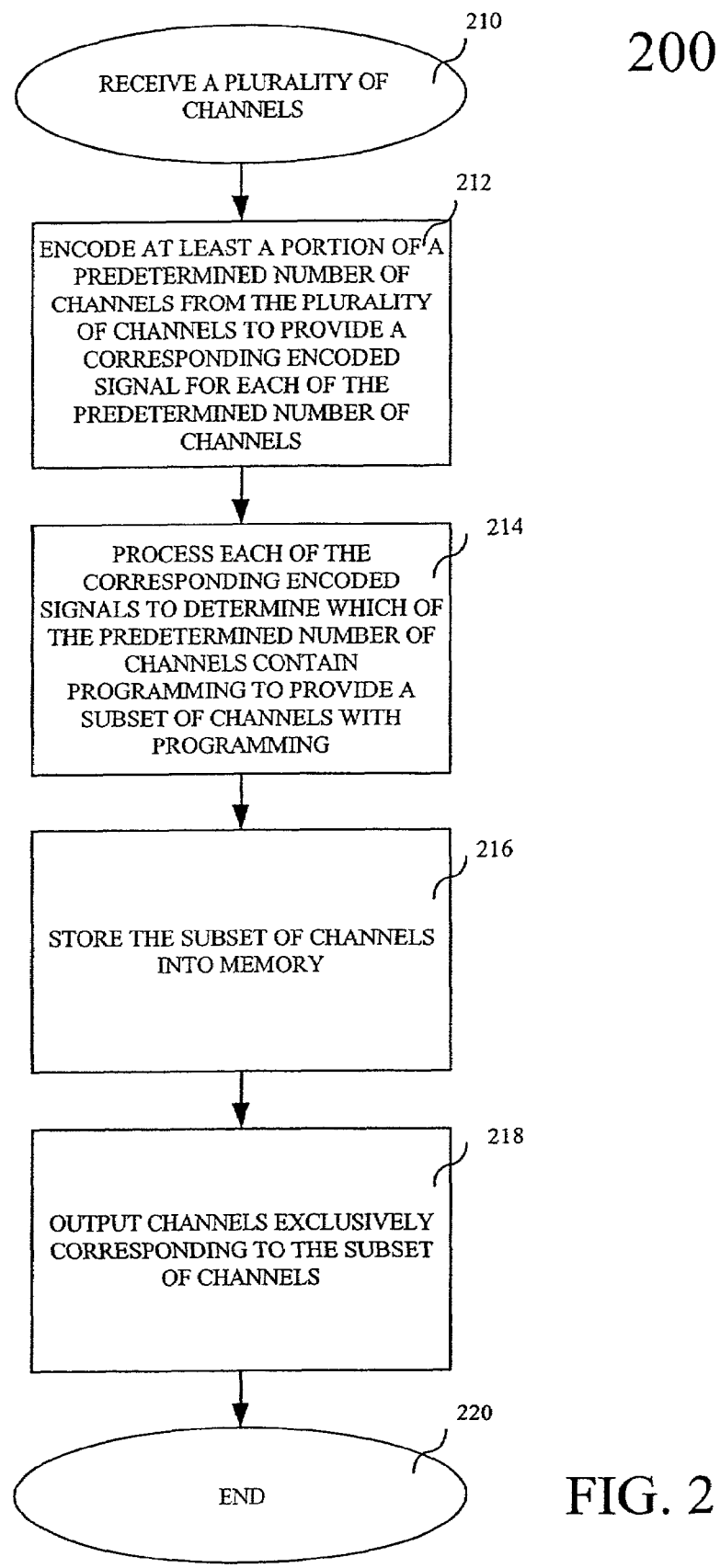
FIG. 2 is a flow chart that illustrates an operation of creating a subset of programming channel indicators in accordance with the inventive arrangements.

FIG. 2 illustrates a flowchart 200 that demonstrates one way in which a subset of channels with programming can be created thereby permitting the automatic skipping of channels with no programming. Programming can include video, audio or a combination thereof. At step 210, a plurality of channels can be received. In one arrangement, these channels can be channels from a digital DBS signal such as a cable or satellite transmission; however, the invention is not so limited, as any other signal containing a plurality of channels in which the channels carry a broadcast signal and one or more of them may carry no programming can be received.

At step 212, a portion of a predetermined number of these plurality of channels can be encoded to provide a corresponding encoded signal for each of the predetermined channels. It should be noted that any number of the plurality of channels can be encoded, including all the plurality of channels. In one arrangement, the encoding step can be performed by encoding a portion of each of the predetermined number of channels into MPEG formatted pictures such as intra (I) pictures or non-intra (non-I) pictures. Non-I pictures can include predictive (P) or bi-directional predictive (B) pictures. The encoded signals can contain any number of I or non-I pictures. In fact, the encoded signal can be limited to merely a single I picture, a single I picture and a single non-I picture or a single non-I picture such as a P picture that contains a number of I macroblocks. As will be explained below, however, the accuracy of the invention may improve as the number of encoded pictures increases for each of the encoded signals.

At step 214, each of the encoded signals can be processed to determine which of the predetermined number of channels contains programming. Once the channels that contain programming are distinguished from those that do not, a subset of channels with programming can be created. In one arrangement, the pictures that were created from the encoding step can be processed to determine whether the particular channel from which they were encoded contains programming.

As an example, if a particular encoded signal contains one or more non-I pictures, then the number of bits in one or more of these non-I pictures can be counted. If the number of bits is lower than a typical non-I picture, for example, 20% lower than typical non-I picture, then there is a good possibility that the encoded signal is a DBS signal that carries no programming. This determination can be made because the non-I pictures from these types of signals contain very little encoded information, as the signal display almost never varies. It should be noted, however, that the invention is not limited to the particular example discussed above, as other thresholds can be used to determine whether a non-I picture is from a non-programming channel.

In another arrangement, the motion vectors in one or more non-intra pictures in the encoded signals can be analyzed to determine whether a particular signal contains a still video pattern. If all the motion vectors have a value of zero or substantially close to zero, then there is a good chance that the non-I pictures from which they are measured are from a signal carrying a still video pattern. To improve the accuracy of the invention, a greater number of these non-I pictures can be checked in accordance with the examples listed above. It should be noted, however, that the invention is not limited to the above examples, as any other suitable means of processing non-I pictures can be used to determine which of the plurality of channels contains programming.

In another arrangement, one or more I pictures in each encoded signal can be processed for purposes of eliminating the signals containing still video patterns. Specifically, the discrete cosine transform (DCT) coefficients in each I picture can be examined; notably, if the DCT alternating current (ac) coefficients are zero or substantially zero in a large number of the macroblocks in a particular I picture, then there is a good possibility that that I picture is from an encoded signal carrying a still video pattern. In another arrangement, information relating to the DCT-ac coefficient values for each macroblock contained in a sample picture from one or more of the non-programming channels can be stored in memory. Subsequently, the DCT-ac coefficients of all or a portion of the macroblocks contained in an I picture being analyzed can then be compared to the sample picture DCT-ac information stored in memory. If there is a correlation between the DCT-ac coefficients of the macroblocks contained in the I picture being analyzed and the DCT-ac coefficients of the macroblocks contained in the sample picture from the particular channel being examined, then there is a good chance that the I picture is from a non-programming channel. In another arrangement, a sample picture can be retrieved from one or more of the non-programming channels and other relevant information from these sample pictures can be stored in memory. As an example, the number of bits in each of these sample pictures can be counted and stored in memory. Subsequently, the number of bits from the I pictures being analyzed can be counted and then compared to the number of bits contained in a corresponding sample picture (a corresponding sample pictures is a sample picture that has been retrieved from the particular channel from which the I pictures being analyzed originate). If the number of bits in a specific I picture are within a predetermined threshold—for example, within twenty percent of the number of bits contained in the sample picture—then there is a good chance that the I picture is from a channel containing no programming. It should be noted that the invention is not limited to this particular example, as any other suitable threshold can be used to help determine whether an I picture is from a non-programming channel.

Similar to the non-I pictures, processing a greater number of I pictures in accordance with the above examples may improve the accuracy of the invention. In addition, the invention is not limited to these examples, as any other suitable means of processing I pictures can be used to determine which of the plurality of channels contains programming. Moreover, if an encoded signal contains both I pictures and non-I pictures, then one or more I and non-I pictures can be processed in accordance with the above examples or any other suitable means; this process of checking both I and non-I pictures can also improve the accuracy of the invention.

Continuing with step 214, once the channels that contain programming are separated from those that do not, the channels that contain programming can be combined to form a subset of channels with programming. As shown in step 216, this subset of channels can be stored into memory. In one arrangement, the subset of channels can be one or more channel indicators, which can be stored in memory. As an example, the channel indicators can preferably be channel numbers or any other suitable means for identifying a particular channel. At step 218, these channel indicators can then be provided to a display device. Since the display device can access a subset of channels containing programming, the display device can skip over the channels that do not carry any programming thereby eliminating the delay associated with browsing through these non-programming channels. Moreover, should the status of one or more of the channels change, for example, if programming is added to a channel that previously carried no programming, then the process can be re-initiated to add (or delete) channels from the subset of channels. At step 220, the process is ended.

In another arrangement, the audio of one or more of the plurality of channels can be processed to determine which channels contain programming. Significantly, the channels that do not have any programming typically do not carry any audio. Thus, the audio level of each channel can be examined to separate the non-programming channels from the channels that have programming. This process of examining the level of audio contained in each channel can be used solely for purposes of creating a subset of channels with programming or can be used to supplement the process discussed in flowchart 200.

Although the present invention has been described in conjunction with the embodiments disclosed herein, it should be understood that the foregoing description is intended to illustrate and not limit the scope of the invention as defined by the claims.

We claim:

1. A method of creating a subset of channels with programming from a plurality of channels, comprising the steps of:

receiving a plurality of channels, wherein the plurality of channels comprises at least one channel with programming;

encoding at least a portion of a predetermined number of channels from the plurality of channels to provide corresponding encoded intra and/or non-intra pictures for each of the predetermined number of channels;

processing at least one of the corresponding intra and/or non-intra pictures for each of the predetermined number of channels to determine which of the predetermined number of channels contain programming to provide the subset of channels with programming; and storing the subset of channels into memory.

2. The method according to claim 1, further comprising the step of outputting channels exclusively corresponding to the subset of channels.

3. The method according to claim 1, further comprising the step of analyzing at least a portion of an audio signal in the predetermined channels to determine which of the predetermined number of channels contain programming.

4. The method according to claim 1, wherein each corresponding encoded signal is an MPEG video signal containing pictures selected from the group comprising intra pictures or non-intra pictures.

5. The method according to claim 4, wherein said processing step further comprises one or more of the steps selected from the group comprising:

counting a number of bits in at least one of the non-intra pictures in the MPEG video signal;

analyzing motion vectors in at least one of the non-intra pictures in the MPEG video signal;

analyzing discrete cosine coefficients of at least one of the intra pictures in the MPEG video signal; or obtaining a sample picture from one or more of the plurality of channels containing no programming, storing information from the sample picture in memory, and comparing information from at least one of the intra pictures in the MPEG video signal with the stored information from the sample picture.

6. The method according to claim 1, wherein said encoding step further comprises the step of encoding at least a portion of each of the plurality of channels to provide the corresponding encoded signal for each of the plurality of channels.

7. The method according to claim 1, wherein the subset of channels comprises a plurality of channel indicators for identifying the channels in the subset of channels.

8. A method of creating a subset of channels with programming from a plurality of channels, comprising the steps of:

receiving a plurality of channels, wherein the plurality of channels comprises at least one channel with programming;

encoding at least a portion of a predetermined number of channels from the plurality of channels to provide corresponding encoded intra and/or non-intra pictures for each of the predetermined number of channels;

processing at least one of the corresponding encoded intra and/or non-intra pictures for each of the predetermined number of channels and a portion of a respective audio signal in the predetermined number of channels from the plurality of channels to determine which of the predetermined number of channels contain programming to provide a program channel subset; and storing the program channel subset into memory.

9. The method according to claim 8, wherein the programming on the subset of channels contains video content.

10. A system for creating a subset of channel indicators for channels with programming from a plurality of channels, comprising:

a receiver for receiving a plurality of channels, wherein the plurality of channels comprises at least one channel with programming;

a video processor programmed to:

encode at least a portion of a predetermined number of channels from the plurality of channels to provide corresponding encoded intra and/or non-intra pictures for each predetermined channel; and process at least one of the corresponding encoded intra and/or non-intra pictures for each of the predetermined number of channels to determine which of the predetermined number of channels contain programming to provide the subset of channel indicators; and memory for storing the subset of channel indicators.

11. The system according to claim 10, wherein the system presents channels corresponding only to the subset of channel indicators stored in memory.

12. The system according to claim 10, further comprising an audio detection circuit for analyzing at least a portion of an audio signal in the predetermined channels to determine which of the predetermined number of channels contain programming.

13. The system according to claim 10, wherein each encoded signal is an MPEG video signal containing pictures selected from the group comprising intra pictures or non-intra pictures.

14. The system according to claim 13, wherein the video processor is further programmed to perform one or more of the steps selected from the group comprising:

counting a number of bits in at least one of the non-intra pictures in the MPEG video signal;

analyzing motion vectors in at least one of the non-intra pictures in the MPEG video signal;

analyzing discrete cosine coefficients of at least one of the intra pictures in the MPEG video signal; or obtaining a sample picture from one or more of the plurality of channels containing no programming, storing information from the sample picture in memory, and comparing information from at least one of the intra pictures in the MPEG video signal with the stored information from the sample picture.

15. The system according to claim 10, wherein the encoder encodes at least a portion of each of the plurality of channels to provide a corresponding encoded signal for each of the plurality of channels.

16. A system for creating a subset of channels with programming from a plurality of channels, comprising:
- a receiver for receiving a plurality of channels, wherein the plurality of channels comprises at least one channel with programming including video and audio;
- an encoder for encoding at least a portion of a predetermined number of channels from the plurality of channels to provide corresponding encoded intra and/or non-intra pictures for each of the predetermined number of channels;
- a processor using at least one of the encoder and an audio detection circuit to process at least a portion of an audio signal in the predetermined number of channels from the plurality of channels, wherein the processor determines which of the predetermined number of channels contain programming to provide a program channel subset containing at least audio and/or video; and
- memory for storing the program channel subset.

17. The system according to claim 10, wherein the subset of channels comprises a plurality of channel indicators for identifying the channels in the subset of channels.

* * * * *